United States Patent [19]

Iselborn et al.

[11] Patent Number: 5,270,149
[45] Date of Patent: Dec. 14, 1993

[54] REVERSIBLE OPTICAL RECORDING MEDIUM OF THE PHASE CHARGE TYPE

[75] Inventors: Stefan Iselborn; Gerd Fischer, both of Ludwigshafen; Hartmut Hibst, Schriesheim, all of Fed. Rep. of Germany

[73] Assignee: BASF Aktiengesellschaft, Ludwigshafen, Fed. Rep. of Germany

[21] Appl. No.: 1,238

[22] Filed: Jan. 6, 1993

Related U.S. Application Data

[63] Continuation of Ser. No. 714,290, Jun. 12, 1991, abandoned.

[30] Foreign Application Priority Data

Jun. 16, 1990 [DE] Fed. Rep. of Germany ....... 4019301

[51] Int. Cl.$^5$ .............................. G03C 1/492
[52] U.S. Cl. ...................... 430/270; 428/64; 428/65; 428/913; 430/495; 430/945; 346/76 L; 346/135.1
[58] Field of Search ................ 428/64, 65, 457, 688, 428/913; 369/288; 346/76 L, 135.1; 430/270, 495, 945

[56] References Cited

U.S. PATENT DOCUMENTS

| | | | |
|---|---|---|---|
| 3,530,441 | 9/1970 | Ovshinsky | 428/432 |
| 3,971,874 | 7/1976 | Ohta et al. | 428/432 |
| 4,278,735 | 7/1981 | Ohta et al. | 428/432 |
| 4,676,646 | 6/1987 | Strand et al. | 427/10 |
| 4,731,755 | 3/1988 | Bjorklund et al. | 369/284 |

FOREIGN PATENT DOCUMENTS

| | | |
|---|---|---|
| 184452 | 6/1986 | European Pat. Off. |
| 195532 | 9/1986 | European Pat. Off. |
| 212336 | 3/1987 | European Pat. Off. |
| 265204 | 4/1988 | European Pat. Off. |

OTHER PUBLICATIONS

Appl. Phys. Letts., vol. 59, No. 10, Mar. 1989, p. 893ff, Maeda et al.

*Primary Examiner*—Patrick J. Ryan
*Assistant Examiner*—Elizabeth Evans
*Attorney, Agent, or Firm*—Keil & Weinkauf

[57] ABSTRACT

The optical recording medium comprises at least one substrate and at least one storage layer of the phase change type with at least three reversibly interswitchable states of differing optical behavior, the difference in reflectivity between at least one pair of states being greater than between the amorphous and the crystalline state.

9 Claims, No Drawings

REVERSIBLE OPTICAL RECORDING MEDIUM OF THE PHASE CHARGE TYPE

This application is a continuation of application Ser. No. 07/714,290, filed on Jun. 12, 1991, now abandoned.

The present invention relates to an optical recording medium comprising at least one substrate and at least one storage layer of the phase change type for repeated recording, erasure and reading of data by irradiation with laser light, possessing at least three states of differing optical behavior which are reversibly switchable into one another and which are each associated with different volume fractions of crystalline and amorphous phase in the storage layer, the difference in reflectivity between at least one pair of states being greater than between the amorphous and the crystalline state.

Phase change media have been used for reversible optical information recording for several years. Examples are tellurium, selenium, chalcogenide alloys based on tellurium or selenium or III-V semiconductor materials which under the action of intense radiation, for example laser light, are reversibly switchable from the amorphous to the crystalline state. In the recording process, appropriate irradiation of the storage material converts the information into amorphous and crystalline areas of the medium. These amorphous and crystalline areas exhibit differing optical behavior which can be characterized in terms of physical variables such as the optical reflectivity, the optical transmissivity or absorptivity, the refractive index or the dielectric constant. Differing behavior is also exhibited in respect of electric properties such as the specific resistance.

In general, the recorded data are read by utilizing the different laser reflectivities of amorphous and crystalline areas. Occasionally, the different optical transmissivities are utilized for reading the data.

The laser light used for reading the data is of lower intensity than that used for writing the data, so that the recorded pattern of amorphous and crystalline areas is not altered by the process of reading.

Examples of optical recording media in which the two states between which switching takes place are in the amorphous phase and in the crystalline phase respectively may be found in EP-A-212 336; U.S. Pat. No. 3,530,441; U.S. Pat. No. 3,971,874; and U.S. Pat. No. 4,278,734.

Frequently, a phase change process is characterized expressly not in terms of the change of the structural phase of the storage material but in terms of the different effects of the structural properties on the optical properties. For instance, EP-A-195 532 does not use the generally customary term "phase change process" but refers to the "optical constant change process". The optical constants in question are the refractive index and the absorption coefficient and a change in just one of them is generally already sufficient to bring about the desired change in the reflectivity. Accordingly, in EP-A-265 204 the phases involved in the phase change process are directly characterized in terms of their different reflectivities.

This way of defining the phase change is not unambiguous. For instance, the reversible optical recording process and medium described in EP-A-184 452 is likewise said to have two states of differing reflectivity. However, the reason it has two states is that the storage material described is capable of forming two stable crystalline states of differing texture.

U.S. Pat. No. 4,719,615 likewise describes a reversible optical storage medium having two states of different reflectivity. This time the reason is a bump-like deformation of the surface which can be created and reversed with laser light.

In EP-A-180 103, the storage medium, which as produced is generally in the amorphous state, is first exposed to an energy pulse in order to transform it into the crystalline state. To this end, the storage medium is oftentimes irradiated with laser light. The process is called formation or initialization.

In general, the writing laser beam of high intensity heats crystalline areas of the storage layer to above their melting point, which in the case of the customary storage materials can be several hundred degrees Celsius. As soon as the laser beam leaves the irradiated area, rapid cooling takes place. The result of this chilling is to convert the crystalline area into an amorphous area. In the process of erasure, the amorphous areas are heated by a low intensity laser beam to the crystallization point, which is lower than the melting point, and are thus converted back into crystalline areas. Occasionally, the converse procedure is used: writing by crystallization, erasure by amorphization.

To permit rapid data transfer, the time required for writing and erasing should be as short as possible. For this reason there has been an intensive search in progress for materials which are erasable with very short laser pulses. EXamples of such materials may be found in EP-A-212 336 and EP-A-217 293.

However, it has been found that precisely these materials have very poor writing properties, since as the material is being written it is also being erased again very rapidly. For this reason it is not possible to switch the storage materials completely into the amorphous state in the desired areas. There is always some crystalline remainder. This behavior can be referred to as "self-erasure". Owing to this property of self-erasure, in existing recording media the difference between the reflectivities of the two states is reduced and the signal amplitude necessary for error-free reading, or a sufficient signal-to-noise ratio, is not always achieved.

It is an object of the present invention to provide optical recording media based on the phase change mechanism where the problem of reduced signal and poor signal-to-noise ratio as a consequence of self-erasure has been solved. The storage layer of such a recording medium must - despite the rapid erasability - ensure that the information-bearing areas of different crystallinities are highly stable and the recording medium itself must be adequately resistant to corrosion.

We have found that this object is achieved by the recording media defined at the beginning.

Preferred recording media of this kind may be found in the subclaims.

It is very surprising that there are optical recording media where the difference in reflectivity between partly crystalline areas having different crystalline-volume fractions is even greater than the difference in reflectivity between amorphous and crystalline areas. This means that in use the partial self-erasure of the rapidly crystallizing material is of advantage, since maximum signal strength is obtained in reading only when the amorphous end state is not reached in writing.

Suitable phase change storage media for the recording elements according to the present invention are the known chalcogenide alloys and III-V semiconductor materials (see Sato et al., Optical Data Storage Meeting, Gordon R. Knight, Clark N. Kurtz, Editors, Proc. SPIE 1078 (1989), 11-13). Preferred storage media of the type mentioned are at least 90% by weight GeTe or GeSb$_2$Te$_4$.

The storage media may contain up to 10% by weight of one or more components which, in respect of the areas of different crystallinities, increase the differences in the optical properties and/or help to stabilize these areas. These components are preferably selected so as to achieve improved corrosion protection. Alternatively, these components may improve corrosion protection only. Examples of such components, which may be present in the phase change medium in an amount of up to 10% by weight, are selenium, sulfur and chromium.

The phase change materials, as will be known, are best employed in the form of thin layers. Thin layers have a lower heat capacity than compact material and therefore can be written with relatively low light intensity. The thin layers are generally applied to substrates by physical methods of deposition such as sputtering or vapor deposition etc.

Examples of suitable substrates are glass, polycarbonate, polymethyl methacrylate and polyvinyl chloride. The most frequently employed substrates are transparent (to allow the phase change layers to be illuminated through the substrates) and carry devices whereby previously recorded information may be relocated. Typical examples thereof are concentric or spiral tracking grooves and various sector data as described for example in DE 30 32 769 C2.

At least one face of the storage layer may have had applied to it a dielectric layer. This preferably transparent layer may serve as an anti-reflective layer and/or as protection from abrasion and/or corrosion. Layers of this type are preferably made of carbide, oxide, nitride, sulfide (ZnS) or a mixture thereof. Particular preference is given to nitride layers of AlN, Si$_3$N$_4$ or mixtures thereof. We have found that the effects of the present invention are obtained for a constant thickness of the dielectric layer irrespectively of which one of the nitride layers mentioned is selected.

Preferably, there is a dielectric layer between the transparent substrate and the storage layer. In a particularly preferred embodiment, there are dielectric layers on both faces of the storage layer.

Preferably, there is a metallically reflecting layer between the layer system comprising the storage layer and any dielectric layers on the one hand and the substrate or the substrate remote face of said layer system. This metallically reflecting layer can be a metallic reflecting layer, for example of aluminum. The thickness of the aluminum layer is more than 10 nm, preferably more than 20 nm, particularly preferably more than 25 nm. Alternatively, the reflecting layer used may also be a dielectric single or multiple layer. Preferred reflecting layers have a reflectivity of greater than 50%.

In a particularly preferred embodiment of the present invention, the recording medium comprises a layer system in which there is a transparent dielectric layer on both faces of the storage layer and a metallic reflecting layer on the substrate remote face of the layer system.

Particularly preferred recording media according to the present invention comprise a substrate and arranged thereon in the stated order a first dielectric layer of AlN and/or Si$_3$N$_4$ from 50 to 200 nm in thickness, a storage layer of GeTe or GeSb$_2$Te$_4$ from 10 to 50 nm in thickness, a second dielectric layer of AlN and/or Si$_3$N$_4$ from 15 to 100 nm in thickness, and an Al layer greater than 20 nm in thickness.

The recording media according to the present invention can be determined as follows:

1) First the refractive index n and the absorption coefficient k of the amorphous and the crystalline form of a phase change layer and possibly of other layers (dielectric layers, reflecting layer, substrate) are determined experimentally in a conventional manner (for example spectral ellipsometry).

2) Then the complex dielectric constant is calculated for both the amorphous and the crystalline form of the storage layer. The complex dielectric constant e defined by equation (1) and the optical constants n and k can be converted into one another without ambiguity by means of equations (2) and (3):

$$e = e_1 + ie_2 \qquad (1)$$

$$e_1 = n^2 - k^2 \qquad (2)$$

$$e_2 = 2nk \qquad (3)$$

3) The dielectric constants of the amorphous form ($e_a$) and of the crystalline form ($e_c$) of the storage layer can be used to determine the dielectric constants of storage layers having any desired volume fraction x of amorphous phase ($e_x$) by a method described by R. W. Cohen et al., Physical Review, B8 (1973), 3689 ff. Equation (4) unambiguously determines for all layers $$(e_x - 2e_a)/(e_x + 2e_a) = (1-x)(e_c - e_a)/(e_c + 2e_a) \qquad (4)$$

having an amorphous-volume fraction x ($0 \leq x \leq 1$) the associated dielectric constant $e_x$. The complex variable $e_x$ ($e_x = e_{1x} + ie_{2x}$) provides via equations (2) and (3) the optical constants $n_x$ and $k_x$ for layers having a varying amorphous-volume fraction x.

4) Care must be taken to choose suitable thicknesses for the layers involved. Given an arbitrary sequence of layers of known refractive indices $n_1$, $n_2$, $n_3$, ..., absorption coefficients $k_1$, $k_2$, $k_3$, ..., and thicknesses $d_1$, $d_2$, $d_3$, ..., it is possible to calculate the reflectivity or transmissivity, for example by the method described by O. S. Heavens in Optical Properties of Thin Solid Films, Butterworths Scientific Publications, London, 1955, pages 69-72.

5) An appropriate computer program will provide a convenient means of varying the thicknesses of all the layers involved and the amorphous-volume fraction of the storage layer and to optimize them in respect of maximal differences in reflectivity between the written and the unwritten state.

The recording media according to the present invention contain at least one storage layer and at least one substrate. Such multiple recording media can be obtained for example by joining together two recording media consisting of a substrate, a storage layer and possible dielectric layers in a suitable manner. To this end, the two recording media can be adhered for example in such a way that the two storage layers come to lie opposite each other.

The individual layers are in general produced by sputtering, since it ensures good reproducibility of the composition of the material and of layer thickness. A further suitable layer-forming method is vapor deposition.

The storage medium according to the present invention, which as produced in general is in the amorphous state, must first be initialized, which may be done with one or more laser pulses at least 10 times longer in duration than those used in writing or erasing. Initialization generally transforms the storage medium into the crystalline state. In those cases where a partly crystalline state possesses maximum reflectivity, the storage medium may be initialized into the partly crystalline state which corresponds to the reflection maximum.

Writing is effected with a laser pulse which switches the storage medium into the partly crystalline state which of all the possible partly crystalline states differs most in reflectance from the initialized state. Erasure is effected with a laser pulse at relatively low intensity, and the (wholly) crystalline state reappears.

This confers several important advantages on the recording media according to the present invention. The write data rate can be higher, since there is no need to wait until a wholly amorphous state is attained. The advantage is even clearer when erasing. When erasing, the transformation from the amorphous into the crystalline state is slower than the transformation in the opposite direction from the crystalline into the amorphous state, since it is first necessary for crystallization nuclei to form. It is a particular advantage, then, of the recording media according to the present invention that the crystallization of the partly crystalline areas is faster than from the amorphous state, since there are already many crystallization nuclei present in the partly crystalline area.

The significance of this advantage can be judged by the fact that recording media having slower erase properties require an erase beam which is elliptical. This means that besides the write laser a second laser is required for erasure alone. It is obvious that an arrangement with one laser is less costly and simpler than an arrangement with two lasers.

A further advantage of the recording media according to the present invention results from the fact that the accuracy to which the degree of crystallinity must be defined is relatively low, so that there is only little signal sensitivity to small fluctuations in the degree of crystallinity.

EXAMPLES

Examples 1 to 4 are in accordance with the prior art, i.e. the maximum difference in reflectance exists between the amorphous and the crystalline phase. Examples 5 to 19 are in accordance with the present invention, i.e. the maximum difference in reflectance exists between a partly and a wholly crystalline phase.

In Examples 1 to 10 the storage layer is made of $GeSb_2Te_4$ and in Examples 11 to 19 it is made of GeTe.

The recording media of Examples 5 to 19 according to the present invention were obtained by the above-described arithmetic method. In the calculations, the optical constants used, determined experimentally by means of spectral ellipsometry, were for example $n_a = 4.4$ and $k_a = 1.7$ for the $GeSb_2Te_4$ storage layer in the amorphous state and $n_c = 4.4$ and $k_c = 3.25$ for the same layer in the crystalline state. The optical constants of the AlN layers were $n = 2.0$ and $k = 0$, and the optical constants of the Al layers were $n = 1.99$ and $k = 7.0$. The substrate had the optical constants $n = 1.5$ and $k = 0$.

In the case of a recording medium having a $GeSb_2Te_4$ storage layer the calculations using the experimentally observed optical constants for the wholly amorphous state and for the wholly crystalline state produced the result that all the storage layers having a volume proportion x of amorphous phase had the optical constants $n_x = 4.4$ and $k_x = k_c + (k_a - k_c)x$.

Further calculations were carried out using the optical constants of all the layers involved to vary the particular layer thicknesses and the volume proportion x of amorphous phase and to calculate the reflectivity.

As the result of optimization calculations we found the novel recording media in respect of which we were able to verify experimentally that the maximum difference in reflectance occurs between a partly crystalline phase and a wholly crystalline phase.

The same procedure was adopted for the GeTe storage layer recording media of Examples 11 to 19 according to the present invention.

EXAMPLES 1 TO 3

Three recording media were fabricated in accordance with the prior art by sputtering a first AlN layer, a $GeSb_2Te_4$ storage layer and a second AlN layer onto a glass substrate (layer thicknesses see Table 1). The AlN layers were produced by reactive magnetron sputtering of an Al cathode (cathode power: 0.4 kW) using as the sputtering gas a mixture of argon ($2.6 \times 10^{-3}$ mbar) and nitrogen ($2.4 \times 10^{-3}$ mbar). The $GeSb_2Te_4$ storage layer was produced by RF diode sputtering of a $GeSb_2Te_4$ target (cathode power: 0.1 kW; deposition rate 20.4 nm/min; substrate-target distance 56 mm). The sputtering gas used was argon ($1 \times 10^{-2}$ mbar). The residual gas pressure before the start of sputtering was at least $10^{-6}$ mbar.

The amorphous $GeSb_2Te_4$ storage layer obtained was transformable into any desired crystalline state by employing laser pulses of varying power and/or duration. The crystallization threshold required laser pulses of 50 ns and 8 mW or of 200 ns and 4 mW. Complete crystallization was obtained with laser pulses 4 mW in power and 10 μs in duration. States of lower crystallinity were obtained with a laser power of 4 mW and shorter pulse durations.

EXAMPLES 4 TO 10

Seven recording media were fabricated by depositing a first AlN layer, a $GeSb_2Te_4$ storage layer, a second AlN layer and an Al layer in succession onto a glass substrate. The AlN layers and the $GeSb_2Te_4$ layer were produced as in Examples 1 to 3. The deposition of the Al layer and the AlN layers by DC magnetron sputtering used the same target. The sputtering gas used for the deposition of the Al layer was argon ($5 \times 10^{-3}$ mbar). The respective layer thicknesses are stated in Table 1. The thickness of the Al layer was in each case 25 nm.

The prior art recording media obtained in Examples 1 to 4, on irradiation with laser light of wavelength 780 nm, exhibited a dependence of the optical reflectivity on the volume proportion of crystalline phase according to which the biggest difference in reflectivity occurs between the wholly amorphous state and the wholly crystalline state of the storage medium (cf. Table 1).

In the recording media of Examples 5 to 10 according to the present invention, the biggest difference in reflectivity, occurs between a partly crystalline, weakly reflecting state and the wholly crystalline, strongly reflecting state (cf. Table 1). Near the minimum the reflectivity was found to be relatively independent of the volume fraction of crystalline phase. For instance, in the case of the recording medium of Example 5 it was found that a crystallinity of up to 55-60% has a lower reflectivity than the wholly amorphous state. The recording media of Examples 5 to 10 were found to have a maximum difference in optical reflectance at different degrees of crystallinity of the partly crystalline state. The results are summarized in Table 1.

TABLE 1

| Example No. | Layer thickness of 1st AlN layer (nm) | Layer thickness of GeSb$_2$Te$_4$ layer (nm) | Layer thickness of 2nd AlN layer (nm) | Crystalline-volume fraction at reflectance minimum |
|---|---|---|---|---|
| 1 | 100 | 100 | 100 | 0% |
| 2 | 80 | 100 | 90 | 0% |
| 3 | 100 | 60 | 100 | 0% |
| 4 | 100 | 30 | 10 | 0% |
| 5 | 70 | 30 | 40 | 25% |
| 6 | 90 | 30 | 40 | 20% |
| 7 | 110 | 30 | 40 | 2% |
| 8 | 70 | 30 | 60 | 45% |
| 9 | 90 | 30 | 60 | 40% |
| 10 | 110 | 30 | 60 | 18% |

EXAMPLES 11 TO 19

A glass substrate was coated in succession with a first AlN. layer, a GeTe storage layer, a second AlN layer and an Al layer. The layers were produced under the same conditions as in Examples 4 to 10; however, the deposition rate for GeTe was 14.8 nm/min. The thickness of each layer is stated in Table 2. The thickness of the Al layer was in each case 100 nm.

TABLE 2

| Example No. | Layer thickness of 1st AlN layer (nm) | Layer thickness of GeTe layer (nm) | Layer thickness of 2nd AlN layer (nm) | Crystalline-volume fraction at reflectance minimum |
|---|---|---|---|---|
| 11 | 50 | 30 | 30 | 12% |
| 12 | 70 | 30 | 30 | 9% |
| 13 | 90 | 30 | 30 | 2% |
| 14 | 50 | 30 | 50 | 32% |
| 15 | 70 | 30 | 50 | 25% |
| 16 | 90 | 30 | 50 | 20% |
| 17 | 50 | 30 | 70 | 51% |
| 18 | 70 | 30 | 70 | 45% |
| 19 | 90 | 30 | 70 | 35% |

As with the GeSb$_2$Te$_4$ storage layer recording media of Examples 5 to 10 according to the present invention, the recording media of Examples 11 to 19 according to the present invention were also found to have the biggest difference in reflectance between a partly crystalline state of low reflectance and the wholly crystalline state of high reflectance.

All the novel recording media of Examples 5 to 19, regardless of the composition of the storage layer, were found to have the following characteristics:

When the storage layer and the second Al layer were of constant thickness it was found that the reflectance minimum occurs with increasing thickness of the first AlN layer at decreasing crystalline-volume fractions. By contrast, when the storage layer and the first AlN layer were of constant thickness it was found that the reflectance minimum occurs with increasing thickness of the second AlN layer at increasing crystalline-volume fractions.

The thickness of the Al layer had no effect on the data, provided it was at least 20 nm. The thickness of the storage layer could be varied at least within the range from 20 to 50 nm without any detectable effect on the data.

The different crystalline-volume fractions were brought about by irradiation with laser pulses (power: 1-8 mW; duration: 50 ns-1 µs).

To determine the crystalline-volume fractions at the reflectance minimum reported in Tables 1 and 2, the measured reflectivities were compared with the reflectivities calculated (see above) for different crystalline-volume fractions (1-x).

We claim:

1. In the method of reversible optical laser recording utilizing a phase changing medium wherein the medium is first written upon by laser light and is subsequently erased by laser light, the improvement wherein said medium comprises at least one substrate and at least one storage layer of the phase change type and possessing at least three states of differing optical behavior which are reversibly switchable into one another and which are each associated with different volume fractions of crystalline and amorphous phase in the storage layer, the difference in reflectivity between at least one pair of states being greater than between the amorphous and the crystalline state, in its amorphous state, and wherein prior to writing and erasure, the medium is initialized by one or more laser pulses at least 10 times longer in duration than those used in writing or erasing, whereby a crystalline or a partially crystalline state is formed.

2. The method of claim 1 wherein there is a dielectric layer on at least one face of the storage layer.

3. The method of claim 2 wherein there is a reflecting layer having a reflectivity of >50% between the layer system comprising the storage layer and any dielectric layers on the one hand and the substrate.

4. The method of claim 3 wherein there is a reflecting layer having a reflectivity of >50% on the substrate remote face of the layer system comprising the storage layer and any dielectric layers.

5. The method of claim 4 wherein the storage layer is at least 90% by weight of a member selected from the group consisting of GeTe and GeSb$_2$Te$_4$.

6. The method of claim 5 wherein the storage layer is at least 90% by weight of a member selected from the group consisting of GeTe and GeSb$_2$Te$_4$.

7. The method of 6 wherein the substrate supports an arrangement comprising
   a) a first AlN layer from 50 to 200 nm in thickness,
   b) a storage layer of GeTe or GeSb$_2$Te$_4$ from 10 to 50 nm in thickness,
   c) a second AlN layer from 15 to 100 nm in thickness, and
   d) an Al layer greater than 20 nm in thickness in the stated order.

8. The method of claim 7 wherein at least one of the two AlN layers has been replaced by a layer of Si$_3$N$_4$.

9. The method of claim 7 wherein at least one of the two AlN layers has been replaced by a layer consisting of a mixture of Si$_3$N$_4$ and AlN.

* * * * *